May 6, 1952    A. B. REID    2,595,884
CUTTING CHAIN FOR SAWS
Filed Feb. 12, 1949

Anthony Brendan Reid
INVENTOR.

BY Alex. E. MacRae
Attorney.

Patented May 6, 1952

2,595,884

UNITED STATES PATENT OFFICE 2,595,884

CUTTING CHAIN FOR SAWS

Anthony Brendan Reid, Lansdowne, Ontario, Canada

Application February 12, 1949, Serial No. 76,159

4 Claims. (Cl. 143—135)

This invention relates to chain saws, and more particularly to the cutting chain structure thereof.

Cutting chains are usually composed of toothed members connected by pivoted links, although it has frequently been proposed to form the tooth members as integral parts of the links. A disadvantage of the heretofore proposed cutting chains is their relatively great number of parts and the difficulty of replacing link and tooth members therein. A further disadvantage is the relatively wide kerf produced in the sawing operation, such wide kerf being an inherent result of the cutting chain structure. While it is obviously desirable to provide a saw which will take out a minimum of wood in the sawing operation, in order to reduce the driving power required and conserve wood, the minimum width of kerf produced by present day cutting chains is substantially three-eighths of an inch.

It is an object of this invention to provide a cutting chain of relatively few parts, each of which have common structural characteristics for ease of manufacture, assembly, and replacement. Another object is to provide a cutting chain having integral tooth and link members, such members having cooperating structural characteristics which, when in associated assembly, provide a chain of relatively narrow overall thickness and resulting narrow kerf production in operation.

Figure 1:
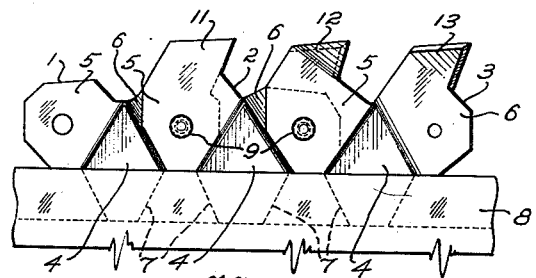
Figure 3:
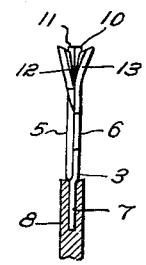
Figure 2:
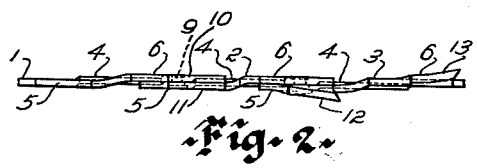
Figure 4:
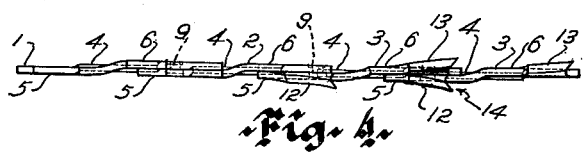
Figure 5:
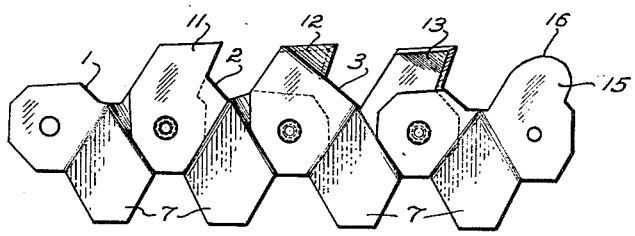

The invention will be described with reference to the accompanying drawing, in which Figure 1 is a side elevation of a portion of cutting chain, in accordance with the invention, Figure 2 is a plan view, Figure 3 is an end elevation, Figure 4 is a plan view of a slightly modified form of cutting chain, and Figure 5 is a side elevation of a further modified form of cutting chain.

Referring to Figures 1, 2 and 3, the cutting chain shown comprises a series of three links 1, 2 and 3, such series being successively repeated throughout the length of the chain. All links are formed from metal plate of uniform thickness throughout and each possesses structural characteristics common to those in the other links of the series, and including a body portion 4 lying in a common vertical plane, a trailing portion 5 also lying in a common vertical plane but laterally offset in one direction from the first plane, and a leading portion 6 also lying in a common vertical plane but laterally offset in the opposite direction from the first plane. The degree of offset in each case is preferably one-half the thickness of the metal plate whereby the overall width of each link is not greater than twice the thickness of the metal plate from which it is formed. A part 7 of each body portion 4 extends downwardly, as shown, to provide a plurality of spaced guide and sprocket-engaging surfaces. As shown in Figures 1 and 2, the parts 7 travel in the usual grooved chain guide 8.

The links are assembled to form a chain with the leading portion of each link overlapping the trailing portion of the next succeeding link, such overlapped portions being pivotally connected as by rivets 9. Since the portions of each such overlapped pair are reversely offset half their thickness, the exposed side surfaces of the overlapped pair each lie in a vertical plane spaced outwardly from the adjacent surface of the body 4 a distance equal to half the thickness of such body, as clearly shown in Figure 3.

Each link carries integrally therewith an upwardly extending tooth structure. Link 1 has a raker tooth section 10 carried by its leading portion 6 and lying in the same plane thereof, the trailing portion 5 of such link being free from tooth structure. Link 2 has a raker tooth section 11 carried by and in the same plane with its trailing portion 5 which overlaps portion 6 of link 1. Raker tooth section 11 is complementary in size with raker tooth section 10 and is transversely aligned therewith, thus forming a complete raker tooth of a thickness equal to the overall width of each link.

The leading portion 6 of link 2 is free from tooth structure.

Link 3 has a cutting tooth 12 carried by its trailing portion 5, and a cutting tooth 13 carried by its leading portion 6. Tooth 12 has a right hand set and tooth 13 a left hand set, as shown, or vice versa, the angle of set varying in the usual manner with the type of wood and operating conditions. The angle of set has been somewhat exaggerated in the drawing for clarity of illustration but, in actual practice, the leading cutting edge of each tooth will project laterally but slightly beyond the plane of the carrying portion 5 or 6.

As previously indicated, a raker tooth link 1 will be pivotally connected to the link 3 and the series repeated in successive order.

The arrangement of links may be varied widely within the scope of the invention. For instance, it may be desirable to provide a double cutting tooth as illustrated in Figure 4. In this modification, instead of following link 3 immediately with the raker tooth links 1 and 2, a second cutter link 3 may be inserted in next successive order to the first link 3, thus providing a double cutting tooth 14 comprising the transversely aligned right and left hand set teeth 12 and 13 and situated between a single right hand set tooth 12 and a single left hand set tooth 13.

The modification shown in Figure 5 is similar in all respects to that shown in Figure 1, except that instead of each alternate set of rakers 10 and 11, stabilizer teeth 15 are provided, such teeth being similar to the raker teeth 10 and 11 but having their upper surfaces 16 disposed in a plane slightly lower than the plane of the upper surfaces of the cutting teeth. Such stabilizer teeth serve to limit the depth of cut effected by the cutting teeth and thus produce a more uniform and stabilized sawing operation whereby less strain is imposed on the sawing machine elements. The distance between such planes, i. e., depth of cut, may be as desired, for instance, within the range of $\frac{1}{16}$ to $\frac{3}{32}$ inch. Preferably the end surfaces of the stabilizer teeth are rounded, as shown.

It will be apparent that the cutting chain described may be manufactured in a convenient and inexpensive manner. Since the major portion of all links have identical structural characteristics and since the cutting teeth 12 and 13 may be of the same shape as the raker teeth 10 and 11, all links may be stamped out of a metal sheet with the same stamp, the underside tooth sections being removed by cutting. Moreover, since the links are cooperatively associated with each other in the resulting chain in such manner that the overall width of the chain is restricted to a minimum, the kerf cut by such chain is substantially narrower than that resulting from use of heretofore proposed chains. Thus, a chain constructed in accordance with this invention is adapted to cut a kerf not exceeding one-quarter of an inch in width, with resulting considerable saving in wood and power.

What is claimed is:

1. In a cutting chain for saws having a plurality of successive series of links, said links each having a planar body portion, a leading portion lying in a plane laterally offset in one direction from the plane of the body portion, and a trailing portion lying in a plane laterally offset in another direction from the plane of the body portion, said body, leading, and trailing portions lying in common planes respectively, the leading portion of each link lying in overlapping abutting relating with the trailing portion of the next succeeding link, said overlapping portions being pivotally connected together, at least one link of each series having a tooth integrally carried by one of its said leading or trailing portions.

2. A cutting chain as defined in claim 1, said tooth comprising a raker tooth section extending upwardly from the leading portion only of said one link, each said series also including a second link having a raker tooth section extending upwardly from its trailing portion only and transversely aligned with said first raker tooth section.

3. A cutting chain as defined in claim 1, said tooth comprising a raker tooth section extending upwardly from the leading portion only of said one link, each said series also including a second link having a raker tooth section extending upwardly from its trailing portion only and transversely aligned with said first raker tooth section, and a third link having a cutting tooth extending upwardly from each of its trailing and leading portions.

4. A cutting chain as defined in claim 1, at least one pair of said overlapped portions in each series carrying transversely aligned upwardly projecting tooth sections constituting a raker tooth, said tooth carried by said one link constituting a cutting tooth projecting upwardly from the leading portion of said one link, a second tooth carried by said one link projecting upwardly from the trailing portion thereof, the upper edges of said raker and cutting teeth lying in substantially the same plane, and at least another pair of said overlapped portions in each series carrying transversely aligned upwardly projecting tooth sections constituting a stabilizing tooth, the upper surface of said stabilizing tooth being disposed in a plane below said plane of the raker and cutting teeth.

ANTHONY BRENDAN REID.

REFERENCES CITED

The following references are of record in the file of this patent:

UNITED STATES PATENTS

| Number | Name | Date |
|---|---|---|
| 865,118 | Muir | Sept. 3, 1907 |

FOREIGN PATENTS

| Number | Country | Date |
|---|---|---|
| 565,089 | Germany | Nov. 25, 1932 |